United States Patent
Lösch et al.

(10) Patent No.: US 11,066,987 B2
(45) Date of Patent: Jul. 20, 2021

(54) METHOD FOR OPERATING A RECIPROCATING PISTON MACHINE HAVING AT LEAST ONE PISTON ROD THAT IS HYDRAULICALLY ADJUSTABLE IN LENGTH

(71) Applicant: AVL LIST GMBH, Graz (AT)

(72) Inventors: Siegfried Lösch, St. Stefan ob Leoben (AT); Alois Fürhapter, Thal (AT); Gerhard Heimel, Graz (AT); Bernhard Kometter, Judendorf (AT); Uwe Dieter Grebe, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 16/487,585

(22) PCT Filed: Feb. 23, 2018

(86) PCT No.: PCT/EP2018/054468
§ 371 (c)(1),
(2) Date: Nov. 4, 2019

(87) PCT Pub. No.: WO2018/154035
PCT Pub. Date: Aug. 30, 2018

(65) Prior Publication Data
US 2020/0056538 A1 Feb. 20, 2020

(30) Foreign Application Priority Data
Feb. 24, 2017 (AT) ................ A 50153/2017

(51) Int. Cl.
*F02B 75/04* (2006.01)
*F16J 7/00* (2006.01)
(Continued)

(52) U.S. Cl.
CPC .......... *F02B 75/044* (2013.01); *F02B 75/045* (2013.01); *F15B 11/16* (2013.01);
(Continued)

(58) Field of Classification Search
CPC ...... F02B 75/044; F02B 75/045; F15B 11/16; F15B 21/041; F16J 7/00; F16J 7/06
See application file for complete search history.

(56) References Cited

U.S. PATENT DOCUMENTS

| 988,344 A | 4/1911 | Holzmueller |
| 1,610,137 A | 12/1926 | Kratsch |

(Continued)

FOREIGN PATENT DOCUMENTS

| AT | 511803 | 3/2013 |
| AT | 514071 | 10/2014 |

(Continued)

OTHER PUBLICATIONS

Translated International Preliminary Report on Patentability for International (PCT) Patent Application No. PCT/EP2018/054468, dated Sep. 6, 2019, 8 pages.

(Continued)

*Primary Examiner* — Syed O Hasan
(74) *Attorney, Agent, or Firm* — Sheridan Ross P.C.

(57) ABSTRACT

The invention relates to a method for operating a reciprocating piston machine, particularly an internal combustion engine, having at least one piston rod that is hydraulically adjustable in length for setting a compression ratio, wherein the piston rod comprises a piston and a hydraulic cylinder for adjusting its length, wherein the piston with the hydraulic cylinder delimits at least one working chamber, through the fill level of which at least two switching positions of the piston rod are possible, wherein independently from the setting of the compression ratio the working chamber is at (Continued)

least partially filled and emptied as a function of at least one first predetermined requirement to effect an at least partial exchange of a hydraulic medium in the at least one working chamber.

14 Claims, 4 Drawing Sheets

(51) Int. Cl.
*F15B 21/041* (2019.01)
*F15B 11/16* (2006.01)
*F16C 7/06* (2006.01)
(52) U.S. Cl.
CPC .............. *F15B 21/041* (2013.01); *F16C 7/06* (2013.01); *F16J 7/00* (2013.01)

(56) References Cited

U.S. PATENT DOCUMENTS

| | | | |
|---|---|---|---|
| 2,033,601 | A | 3/1936 | Wohanka |
| 2,134,995 | A | 11/1938 | Anderson |
| 2,217,721 | A | 10/1940 | Anthony |
| 2,252,153 | A | 8/1941 | Anthony |
| 2,778,378 | A | 1/1957 | Presnell |
| 2,989,954 | A | 6/1961 | Hulbert |
| 3,171,334 | A | 3/1965 | Rasmussen |
| 4,124,002 | A | 11/1978 | Crise |
| 4,140,091 | A | 2/1979 | Showers, Jr. |
| 4,195,601 | A | 4/1980 | Crise |
| 4,370,901 | A | 2/1983 | Bolen |
| 4,406,256 | A | 9/1983 | Akkerman |
| 5,178,103 | A | 1/1993 | Simko |
| 5,562,068 | A | 10/1996 | Sugimoto et al. |
| 5,724,863 | A | 3/1998 | Kramer et al. |
| 5,960,750 | A | 10/1999 | Kreuter |
| 6,394,048 | B1 | 5/2002 | Styron |
| 6,604,496 | B2 | 8/2003 | Bartsch et al. |
| 8,746,188 | B2 | 6/2014 | Wilkins |
| 9,528,546 | B2 | 12/2016 | Melde-Tuczai |
| 9,617,911 | B2 | 4/2017 | Paul |
| 9,670,952 | B2 | 6/2017 | Melde-Tuczai et al. |
| 9,828,909 | B2 * | 11/2017 | Paul .......................... F16C 7/06 |
| 9,845,738 | B2 | 12/2017 | Pluta |
| 10,273,841 | B2 * | 4/2019 | Kuroda ................. F01M 9/108 |
| 1,029,485 | A1 | 5/2019 | Melde-Tuczai et al. |
| 2004/0187634 | A1 | 9/2004 | Meyer |
| 2008/0115769 | A1 | 5/2008 | Mason |
| 2008/0251158 | A1 | 10/2008 | Koch |
| 2009/0107467 | A1 | 4/2009 | Berger |
| 2009/0205615 | A1 * | 8/2009 | Cannata ................ F02B 75/044 123/48 B |
| 2010/0132672 | A1 | 6/2010 | Lee et al. |
| 2010/0218746 | A1 | 9/2010 | Rabhi |
| 2013/0247879 | A1 | 9/2013 | Von Mayenburg |
| 2015/0122077 | A1 | 5/2015 | Melde-Tuczai et al. |
| 2015/0152794 | A1 | 6/2015 | Paul |
| 2016/0177997 | A1 * | 6/2016 | Ezaki ....................... F16C 7/06 123/48 B |
| 2016/0222880 | A1 | 8/2016 | Velazquez |
| 2016/0305471 | A1 | 10/2016 | Wittek |
| 2016/0333780 | A1 | 11/2016 | Kamo et al. |
| 2018/0258846 | A1 | 9/2018 | Kamo et al. |
| 2018/0266313 | A1 | 9/2018 | Melde-Tuczai et al. |
| 2018/0363546 | A1 | 12/2018 | Theissl |
| 2018/0371988 | A1 | 12/2018 | Melde-Tuczai et al. |
| 2019/0234300 | A1 | 8/2019 | Melde-Tuczai et al. |
| 2019/0242300 | A1 | 8/2019 | Pichler et al. |

FOREIGN PATENT DOCUMENTS

| | | |
|---|---|---|
| AT | 517100 | 11/2016 |
| AT | 517112 | 11/2016 |
| AT | 517217 | 12/2016 |
| AT | 517492 | 2/2017 |
| AT | 517619 | 3/2017 |
| AT | 517624 | 3/2017 |
| AT | 517718 | 4/2017 |
| CN | 101109321 | 1/2008 |
| CN | 102330561 | 1/2012 |
| CN | 103047409 | 4/2013 |
| CN | 103398001 | 11/2013 |
| CS | 229539 | 6/1984 |
| DE | 1205390 | 11/1965 |
| DE | 1287345 | 1/1969 |
| DE | 2161580 | 7/1973 |
| DE | 2414020 | 10/1975 |
| DE | 3149306 | 6/1983 |
| DE | 8429462 | 2/1985 |
| DE | 3507327 | 9/1986 |
| DE | 4026492 | 2/1992 |
| DE | 4133188 | 4/1992 |
| DE | 4226361 | 4/1994 |
| DE | 4315463 | 5/1994 |
| DE | 29608749 | 7/1996 |
| DE | 19612721 | 10/1996 |
| DE | 19703948 | 6/1998 |
| DE | 19835146 | 6/1999 |
| DE | 10213890 | 10/2002 |
| DE | 10201601 | 6/2003 |
| DE | 10230427 | 1/2004 |
| DE | 102005036701 | 2/2007 |
| DE | 102005055199 | 5/2007 |
| DE | 102007040699 | 3/2009 |
| DE | 102008038971 | 2/2010 |
| DE | 102010016037 | 9/2011 |
| DE | 102011104934 | 12/2012 |
| DE | 102012020999 | 1/2014 |
| DE | 102013210494 | 12/2014 |
| DE | 102013111617 | 4/2015 |
| DE | 102013113432 | 6/2015 |
| DE | 102014200162 | 7/2015 |
| DE | 102014004987 | 10/2015 |
| DE | 102015001066 | 10/2015 |
| DE | 102014220177 | 5/2016 |
| EP | 0438121 | 7/1991 |
| EP | 1065393 | 1/2001 |
| EP | 2280198 | 2/2011 |
| FR | 2857408 | 1/2005 |
| FR | 2889864 | 2/2007 |
| GB | 161580 | 7/1922 |
| GB | 898268 | 6/1962 |
| GB | 2161580 | 1/1986 |
| JP | S52-9703 | 1/1977 |
| JP | S58-165543 | 9/1983 |
| JP | S61-24804 | 2/1986 |
| JP | 2003-129817 | 5/2003 |
| JP | 2005-267420 | 9/2005 |
| JP | 2010-112286 | 5/2010 |
| JP | 2010-112448 | 5/2010 |
| NL | 7602119 | 9/1977 |
| RU | 2226626 | 4/2004 |
| SU | 1008523 | 3/1983 |
| WO | WO 96/01943 | 1/1996 |
| WO | WO 02/10568 | 2/2002 |
| WO | WO 2012/113349 | 8/2012 |
| WO | WO 2014/005984 | 1/2014 |
| WO | WO 2014/019684 | 2/2014 |
| WO | WO 2014/188060 | 11/2014 |
| WO | WO 2015/055582 | 4/2015 |
| WO | WO 2015/082722 | 6/2015 |
| WO | WO 2015/172168 | 11/2015 |
| WO | WO 2015/193437 | 12/2015 |
| WO | WO 2016/042605 | 3/2016 |
| WO | WO 2016/083592 | 6/2016 |
| WO | WO 2016/103554 | 6/2016 |

(56) References Cited

FOREIGN PATENT DOCUMENTS

| WO | WO 2016/203047 | 12/2016 |
| WO | WO 2017/001229 | 1/2017 |
| WO | WO 2017/025580 | 2/2017 |

OTHER PUBLICATIONS

Official Action for Austria Patent Application No. A 50153/2017, dated Sep. 7, 2017, 3 pages.
Official Action for Austria Patent Application No. A 50153/2017, dated Nov. 27, 2017, 3 pages.
Decision to Grant for Austria Patent Application No. A 50153/2017, dated Feb. 2, 2018, 3 pages.
International Search Report prepared by the European Patent Office dated Apr. 5, 2018, for International Application No. PCT/EP2018/054468, 3 pages.
Official Action with machine translation for China Patent Application No. 201880024005.4, dated Mar. 2, 2021, 13 pages.

\* cited by examiner

METHOD FOR OPERATING A RECIPROCATING PISTON MACHINE HAVING AT LEAST ONE PISTON ROD THAT IS HYDRAULICALLY ADJUSTABLE IN LENGTH

CROSS REFERENCE TO RELATED APPLICATIONS

This application is a national stage application under 35 U.S.C. 371 and claims the benefit of PCT Application No. PCT/EP2018/054468 having an international filing date of 23 Feb. 2018, which designated the United States, which PCT application claimed the benefit of Austria Patent Application No. A50153/2017 filed 24 Feb. 2017, the disclosures of each of which are incorporated herein by reference in their entireties.

The invention relates to a reciprocating piston machine, particularly an internal combustion engine, having at least one hydraulically controlled adjustable piston rod for setting a compression ratio $\varepsilon$, wherein the piston rod comprises a piston and a hydraulic cylinder for adjusting the length, wherein the piston together with the hydraulic cylinder delimits at least one working chamber, with the fill level of which enabling at least two switching positions of the piston rod. The invention further relates to a method for operating such a reciprocating piston machine.

By changing the compression of the reciprocating piston machine in drive mode, full load can run at a lower compression ratio $\varepsilon$ and partial load and starting of a reciprocating piston machine can run at an increased compression ratio $\varepsilon$. This thereby reduces consumption in the partial load range, increases the compression pressure upon start with increased compression ratio $\varepsilon$, and at high power, reduces the peak pressure with reduced compression ratio $\varepsilon$ as well as prevents knocking.

Printed publication WO 2015/055582 A2 relates to a length-adjustable piston rod for a reciprocating piston machine of variable compression ratio, wherein the piston rod comprises at least one first rod part having a small connecting rod eye and a second rod part having a large connecting rod eye, the two rod parts being telescopically displaceable relative to and/or into each other, wherein the second rod part forms a guide cylinder and the first rod part forms a longitudinally displaceable piston element in the guide cylinder, wherein a first high pressure chamber stretches between the second rod part and the piston element on the side of the piston element facing the large connecting rod eye into which at least a first oil channel leads in which a first check valve which in particular opens in the direction of the first high pressure chamber is arranged, wherein at least a first return channel extends from the first high pressure chamber, its outflow cross section able to be closed by a control valve in a first position and opened in a second position, wherein preferably the control valve has a control piston axially displaceable in a receiving bore of the second rod part of the piston rod which is in particular displaceable into the first position by means of a return spring and displaceable into the second position against the force of the return spring by an actuating force, wherein the piston element is configured as a double-acting piston, preferably a stepped piston.

Instead of a telescopic system for adjusting compression ratio $\varepsilon$, the use of an eccentrically arranged small connecting rod eye, an eccentric gudgeon pin or an eccentric crankpin of the crankshaft is also known.

Thus, printed publication DE 10 2014 004 987 A1 relates to a variable compression ratio (VCR) piston engine having a connecting rod comprising a compression piston, wherein the connecting rod has an adjusting mechanism for adjusting the compression piston and the adjusting mechanism comprises a first support piston in a first supporting cylinder and a second support piston in a second supporting cylinder of the connecting rod, wherein the first and the second supporting cylinder are each connected to a first control line via which a medium flows into and out of the supporting cylinder in order to adjust the respective supporting cylinder, wherein at least one additional second control line for at least draining the medium leads into at least one of the two supporting cylinders in order to adjust the associated supporting cylinder.

In general, the connecting rod length is adaptively varied between at least one long and one short switching position depending on characteristics, wherein the first long switching position effects a high compression ratio and the second short switching position effects a low compression ratio $\varepsilon$. Depending on driving mode and the load thereby required, the length of the connecting rod remains unchanged. Not until the compression ratio $\varepsilon$ is to be set to a different value, for example when changing from full load range to a partial load range, does the compression ratio $\varepsilon$ and thus the length of the piston rod also change.

One task of the invention is that of providing a reciprocating piston machine and a method for operating such a reciprocating piston machine which allows for the function of at least one piston rod of the reciprocating piston machine being hydraulically adjustable in length. Particularly a task of the invention is preventing the overheating of hydraulic medium as used in adjusting the length of the hydraulically length-adjustable piston rod.

This task is solved by a method in accordance with claim 1 and by a reciprocating piston machine in accordance with claim 12. Advantageous embodiments are claimed in the dependent claims. The claims are expressly made part of the description.

A first aspect of the invention relates to a method for operating a reciprocating piston machine, particularly an internal combustion engine, having at least one piston rod which is hydraulically adjustable in length for setting a compression ratio $\varepsilon$, wherein the piston rod comprises a piston and a hydraulic cylinder for adjusting the length, wherein the piston together with the hydraulic cylinder delimits at least one working chamber, with the fill level of which enabling at least two switching positions of the piston rod, wherein independent of the setting of the compression ratio $\varepsilon$, the working chamber is at least partially filled and emptied as a function of at least one first predetermined condition in order to effect an at least partial exchange of a hydraulic medium in the at least one working chamber.

A second aspect of the invention relates to a reciprocating piston machine, particularly an internal combustion engine, having at least one piston rod which is hydraulically adjustable in length for setting a compression ratio $\varepsilon$, wherein the piston rod comprises a piston with a hydraulic cylinder for adjusting the length, wherein the piston together with the hydraulic cylinder delimits at least one working chamber, with the fill level of which enabling at least two switching positions of the piston rod, wherein the reciprocating piston machine further comprises means for realizing an at least partial filling and emptying of the at least one working chamber as a function of at least a first predetermined condition and independent of the setting of the compression ratio ε in order to effect an at least partial exchange of a hydraulic medium in the at least one working chamber.

The invention is based in particular on the realization that high loads act on the relatively small volume of the hydraulic cylinder through the piston, which is subjected to the pressures in the working chamber of the internal combustion engine. These lead to a rise in the temperature of the hydraulic medium in the working chambers (pressure chambers of the hydraulic cylinders). Particularly when the hydraulic medium remains in the hydraulic cylinder for a longer period of time, the hydraulic medium can thereby experience aging effects, in particular from overheating. In particular, additives in the hydraulic medium may be chemically decomposed or destroyed. This effect is thereby further facilitated because waste heat from the combustion process in an internal combustion engine acts on the hydraulic cylinder by radiation and thermal conduction.

The invention follows the approach of filling and emptying effecting an exchange of the hydraulic medium even without adjustment to the compression ratio ε. Preferably, the compression ratio ε thereby has substantially the same value before and after the filling and emptying.

The exchange of hydraulic medium can prevent aging effects. In particular, clogging of the hydraulic medium lines in the length-adjustable piston rod or in the crankshaft can be prevented or at least the likelihood of such an incident can be reduced.

At least one working chamber can thereby be completely filled and emptied, Preferable, however, is only a partial filling and emptying so that only a portion of the hydraulic medium is exchanged.

In one advantageous embodiment of the invention, the piston together with the hydraulic cylinder delimits two working chambers, with the respective fill level of which enabling at least two switching positions of the piston rod, wherein the working chambers are oppositely filled and emptied in turn respectively.

In a further advantageous embodiment of the invention, the at least one working chamber is at least partially filled and emptied at a low load point, particularly lower than half the maximum load, and/or at low torque, particularly lower than half the maximum torque. Filling and emptying at a relatively low load point ensures that the piston rod is not subjected to great loads in the long switching position, which is at least passed through during filling and emptying, which could lead to damaging the length-adjustable piston rod. As initially noted, the long switching state for setting a high compression ratio ε is generally in the lower partial load range.

In a further advantageous embodiment of the inventive method, an amount of fuel injected and/or the lambda ratio of a cylinder of the internal combustion engine with the at least one hydraulically length-adjustable connecting rod is temporarily adjusted in order to lower a load relative to the cylinder, particularly when in a short switching position. Reducing load is advantageous particularly when the working chamber is filled and emptied starting from a short switching position of, as initially described, generally high load. Any damage to the length-adjustable piston rod can thereby be avoided.

In a further advantageous embodiment of the inventive method, the at least one piston rod hydraulically adjustable in length is sprayed with a coolant for cooling purposes, in particular with hydraulic medium and/or a lubricant. Preferably, this spraying is realized by a piston cooling device which additionally moistens the at least one hydraulically length-adjustable piston rod. Since the piston rod is cooled from the outside, an aging effect on the hydraulic medium can thereby be prevented independently of or additionally to an exchange of hydraulic medium.

In a further advantageous embodiment of the invention, the spraying of the piston rod is initiated as a function of at least one second predetermined condition, in particular prior to a working chamber being at least partially filled and emptied. According to this advantageous embodiment, the filling and emptying of the working chamber for the at least partial exchange of the hydraulic medium is not implemented until cooling by means of the coolant spray is no longer sufficient. A temporary deviation from the optimal piston rod length can thereby be prevented or at least be limited to a minimum duration.

In a further advantageous embodiment of the inventive method, the at least one first and/or second predetermined condition relates to a parameter selected from among a group comprising the following parameters: hydraulic medium temperature, length of time since compression ratio ε change, length of time since last at least partial hydraulic medium exchange, amount of hydraulic medium exchanged in the last at least partial hydraulic medium exchange, switching position, load point.

In a further advantageous embodiment of the inventive method, the piston rods in a reciprocating piston machine having multiple piston rods hydraulically adjustable in length are filled and emptied in succession. Doing so can thereby prevent experiencing a noticeable change in the drivability of a vehicle having an inventive reciprocating piston machine through the filling and emptying.

The advantages and features described above with respect to the method according to the first aspect of the invention equally apply to the reciprocating piston machine according to the second aspect of the invention and vice versa.

In one advantageous embodiment of the inventive reciprocating piston machine having a piston rod which is hydraulically adjustable in length for setting a compression ratio ε and a piston cooling device, the piston cooling device is configured so as to also spray the piston rod with a coolant, in particular a hydraulic medium and/or a lubricant.

In a further advantageous embodiment of the inventive reciprocating piston machine, the piston cooling device has at least one spray nozzle directed toward at least one section of the piston rod's range of travel.

Figure 1:
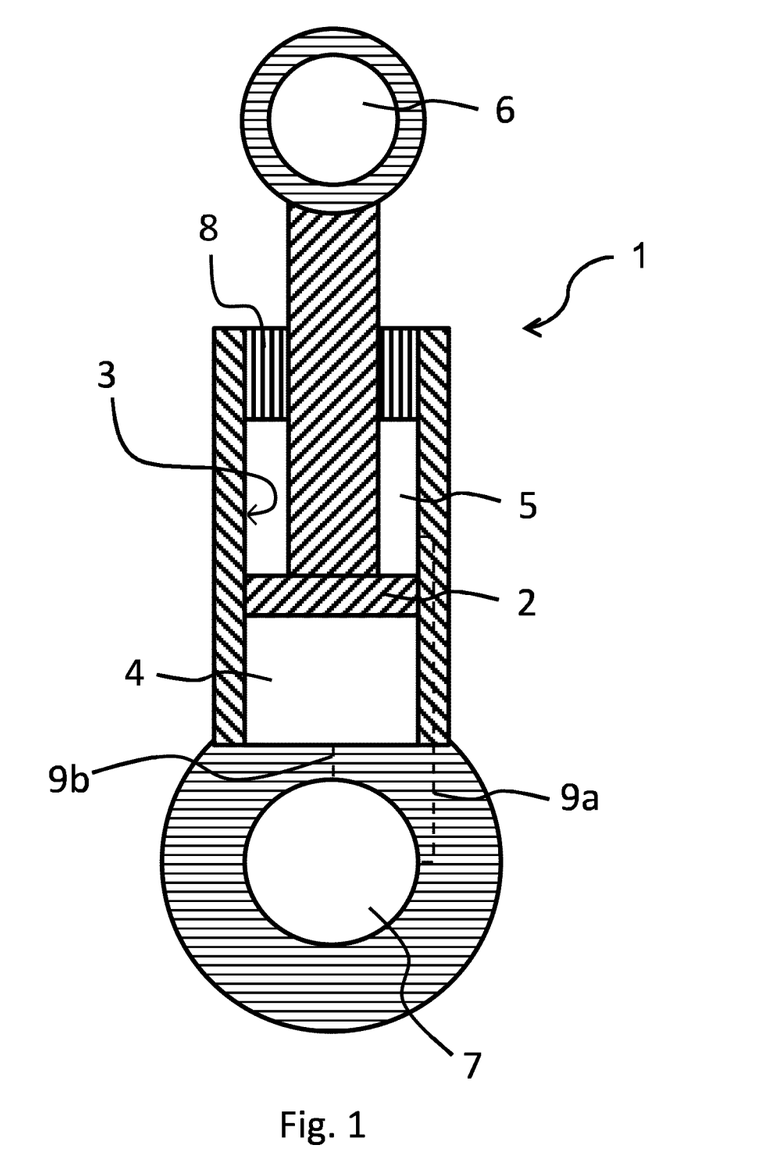
FIG. 1 a length-adjustable piston rod as defined by the invention.

Further advantages and features are yielded by the following description of exemplary embodiments of the invention in relation to the figures. Shown are:

FIG. 1 shows one embodiment of a length-adjustable piston rod 1 as can be used in an inventive, reciprocating piston machine 10.

The piston rod preferably comprises a small connecting rod eye 6 and a large connecting rod eye 7. A shaft thereby connects the small connecting rod eye 6 to a piston 2. The large connecting rod eye 7 is connected to a hydraulic cylinder 3 in which the piston 2 is movably disposed. The piston 2 thereby preferably divides the hydraulic cylinder 3 into two working chambers 4, 5. The second working chamber 5 is preferably closed to the outside by a casing 8. The first working chamber 4 is preferably filled with and emptied of hydraulic medium via a line 9b, in particular a hydraulic line, which preferably leads into the large connecting rod eye. The second working chamber 5 is preferably filled and emptied via a further line 9a. This further line 9a preferably also leads into the large connecting rod eye.

The lines 9a, 9b are preferably supplied with hydraulic medium via a not shown crankshaft of the reciprocating piston machine. The position of the piston 2 in the hydraulic cylinder 3 can thereby be changed for example by different hydraulic medium pressures applied to the lines 9a, 9b. Preferably, a switching device may be additionally or alternatively provided in the piston rod 1 for switching the inflow and/or outflow of the working chambers 4, 5. This switching element can also be actuated by means of different pressures applied by the hydraulic medium and/or actuated electromagnetically and/or mechanically.

A length-adjustable piston rod 1 in the sense of the invention is not, however, limited to the embodiment in FIG. 1. In particular, the piston can also be a so-called rotary piston which prevents or enables a length adjustment of the piston rod by means of an arrester and/or a threaded spindle. Moreover, the piston can also be configured, in conjunction with the hydraulic cylinder, to change the position of an eccentrically arranged small connecting-rod eye 6 so that an effective piston rod length; i.e. the distance between the center of the large connecting rod eye 7 and the center of the small connecting rod eye 6, can be changed.

Figure 2:
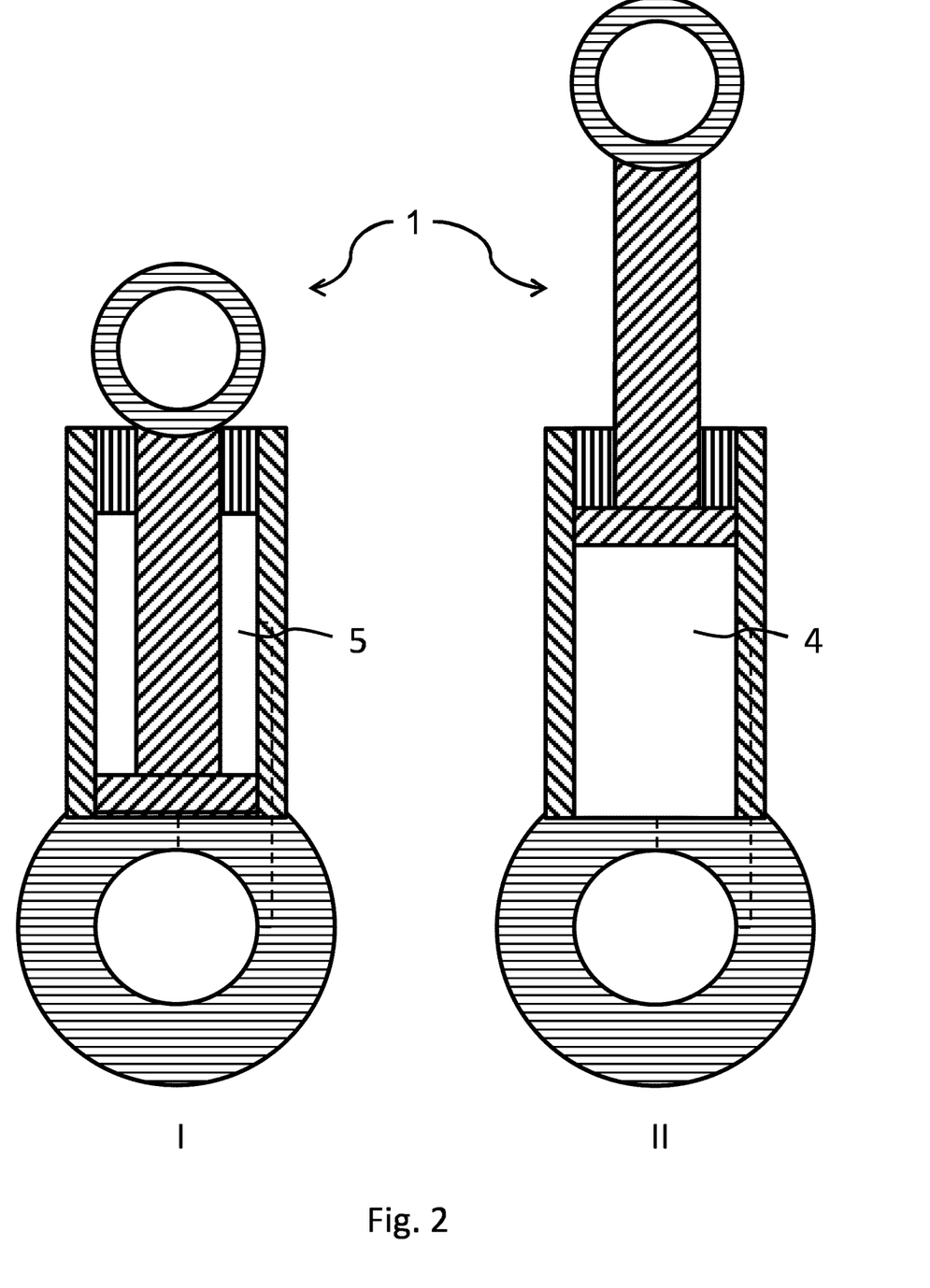
FIG. 2 the length-adjustable piston rod according to FIG. 1 in two different switching positions.

FIG. 2 shows two switching positions of a length-adjustable piston rod according to FIG. 1. In the first short switching position, the first working chamber 4 is completely emptied and/or the second working chamber 5 is completely filled. In the second long switching position II, the first working chamber 4 is completely filled and/or the second working chamber 5 completely emptied. The at least two switching positions I, II of the piston rod 1 thus correspond to different states of length of the length-adjustable piston rod 1. Preferably, the length-adjustable piston rod 1 is conveyed from switching state I into the second switching state II and back into the first switching state I upon the filling and emptying according to the invention. Alternatively, the piston rod 1 is conveyed from the second switching state II into the first switching state I and back into the second switching state II. Preferably, the working chambers 4, 5 are thereby completely emptied and filled in each case, further preferably only partially emptied and filled. Further preferably, only one of the working chambers 4, 5 is in each case at least partially filled and emptied.

Figure 3:
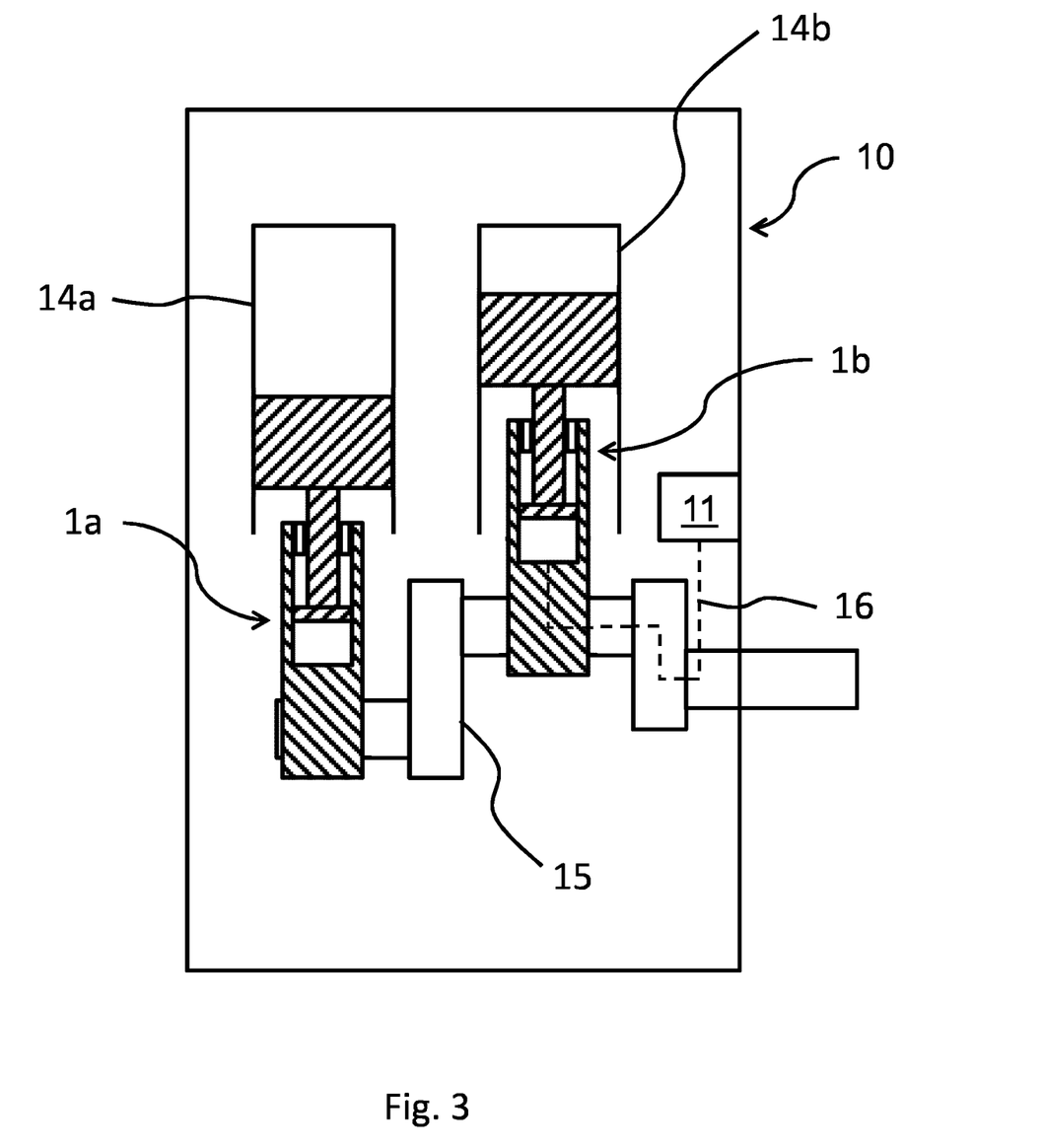
FIG. 3 a first exemplary embodiment of an inventive reciprocating piston machine.

FIG. 3 shows a first exemplary embodiment of an inventive reciprocating piston machine 10. Same comprises two cylinders 14a, 14b, each having a respective length-adjustable piston rod 1a and 1b which, together with a reciprocating piston, each limit a combustion chamber in the respective cylinder. The length-adjustable piston rods 1a, 1b thereby connect the respective reciprocating piston of the cylinders 14a, 14b to the crankshaft 15.

Furthermore, the reciprocating piston machine 10 comprises a controller 11 which controls a filling and emptying of at least one of the working chambers 4, 5 of the length-adjustable piston rod 1a, 1b by way of a line 16 preferably guided by the crankshaft 15. The respective working chambers 4, 5 of the length-adjustable piston rods 1a, 1b can thereby be supplied by a common hydraulic line 16 or also by separate hydraulic lines.

Figure 4:
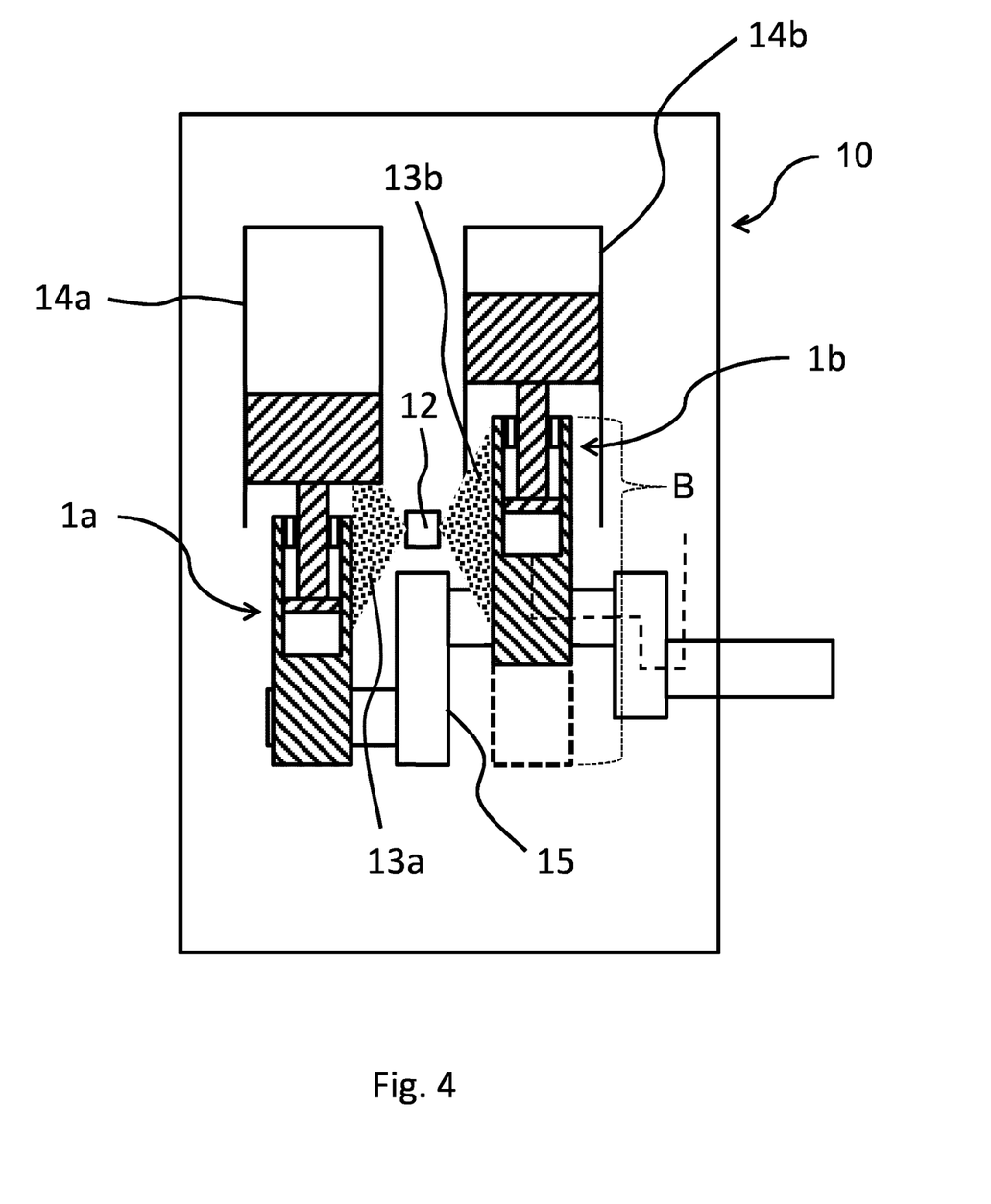
FIG. 4 a second exemplary embodiment of an inventive reciprocating piston machine.

FIG. 4 shows a second exemplary embodiment of an inventive reciprocating piston machine 10. In contrast to the first exemplary embodiment of an inventive reciprocating piston machine 10 according to FIG. 3, the second exemplary embodiment comprises a cooling device 12 which is able to spray the length-adjustable piston rods 1a, 1b of the cylinders 14a, 14b with a coolant, in particular hydraulic medium.

To that end, the cooling device 12, which is preferably integrated into a piston cooling device, preferably exhibits spray nozzles which produce spray cones 13a, 13b which spray the length-adjustable piston rods 1a, 1b in at least one section of their range of travel B. With respect to the second cylinder 14b, the range of travel of the second length-adjustable piston rod 1b is indicated by the dotted lines and its axial extension in relation to the second cylinder 14b by a curly bracket. As an alternative to the exemplary embodiment shown in FIG. 4, an inventive reciprocating piston machine may additionally comprise means 11 for realizing at least partial filling and emptying. This alternative would correspond to that of FIG. 3 with the cooling device 12 from FIG. 4.

What is claimed is:

1. A method for operating a reciprocating piston machine, the method comprising:
    providing the reciprocating piston machine having a piston rod that is hydraulically adjustable in length for setting a compression ratio, wherein the piston rod comprises a piston and a hydraulic cylinder for adjusting the length of the piston rod, wherein the piston together with the hydraulic cylinder delimit a first working chamber and a second working chamber, the first working chamber and the second working chamber housed within the same hydraulic cylinder,
    using a first fill level of the first working chamber and a second fill level of the second working chamber to enable at least two switching positions of the piston rod, oppositely filling and emptying the first and second working chambers in turn respectively, and
    independent of the setting of the compression ratio, at least partially filling and emptying at least one of the first and second working chambers as a function of at least one first predetermined condition in order to effect an at least partial exchange of a hydraulic medium in at least one of the first and second working chambers actuated by means of switching an outflow of the first working chamber and the second working chamber.

2. The method according to claim 1, wherein the compression ratio has substantially the same value before and after filling and emptying at least one of the first and second working chambers.

3. The method according to claim 1, wherein the filling and emptying of at least one of the first and second working chambers occurs at a low load point and/or at low torque.

4. The method according to claim 3, wherein an amount of fuel injected and/or a lambda ratio of a cylinder of the reciprocating piston machine with the hydraulically length-adjustable piston rod is temporarily adjusted in order to lower a load relative to the cylinder, thus a switching position corresponds to a shorter piston rod length.

5. The method according to claim 1, further comprising spraying the hydraulically adjustable in length piston rod with a coolant for cooling purposes.

6. The method according to claim 5, wherein spraying the piston rod is initiated as a function of at least one second predetermined condition.

7. The method according to claim 6, wherein at least one of the first predetermined condition and the second predetermined condition relates to a parameter selected from a group comprising the following parameters: a hydraulic medium temperature, a length of time since a compression ratio change, a length of time since a last at least partial hydraulic medium exchange, an amount of hydraulic medium exchanged in the last at least partial hydraulic medium exchange, a switching position, a load point, and any combinations thereof.

8. The method according to claim 1, further comprising:
providing the reciprocating piston machine with multiple piston rods that are hydraulically adjustable in length, and
filling and emptying the multiple piston rods in succession.

9. An electronic controller comprising a memory and a microprocessor configured to implement a method according to claim 1.

10. A computer program containing instructions which, when executed by a computer, prompts the computer to execute the steps of a method according to claim 1.

11. A machine-readable medium on which a computer program according to claim 10 is stored.

12. A reciprocating piston machine having at least one piston rod that is hydraulically adjustable in length for setting a compression ratio, wherein the piston rod comprises a piston and a hydraulic cylinder for adjusting the length, wherein the piston together with the hydraulic cylinder delimit a first working chamber and a second working chamber, the first working chamber and the second working chamber housed within the same hydraulic cylinder, using a first fill level of the first working chamber and a second fill level of the second working chamber to enable at least two switching positions of the piston rod, wherein the reciprocating piston machine further comprises means for realizing a filling and emptying of the first and second working chambers by means of a switching device for switching an outflow of the first and second working chambers as a function of at least a first predetermined condition and independent of the setting of the compression ratio in order to effect an at least partial exchange of a hydraulic medium in at least one of the first and second working chambers.

13. A reciprocating piston machine, according to claim 12, further comprising a cooling device, wherein the cooling device is configured so as to also spray the piston rod with a coolant.

14. A reciprocating piston machine according to claim 13, wherein the cooling device comprises at least one spray nozzle directed toward at least one section of a range of travel of the piston rod.

* * * * *